United States Patent [19]

Graber

[11] 4,270,574
[45] Jun. 2, 1981

[54] CLOCKWORK CONTROL VALVE MECHANISM

[75] Inventor: Heinz Graber, Oberkulm, Switzerland

[73] Assignee: Aktiengesellschaft Karrer, Weber & Cie, Switzerland

[21] Appl. No.: 969,688

[22] Filed: Dec. 14, 1978

[30] Foreign Application Priority Data

Dec. 28, 1977 [CH] Switzerland ............... 16112/77

[51] Int. Cl.³ ........................... F16K 31/48
[52] U.S. Cl. ........................ 137/624.11; 137/637
[58] Field of Search ............. 137/624.12, 624.11, 137/637

[56] References Cited

U.S. PATENT DOCUMENTS

| 2,012,532 | 8/1935 | Grayson | 137/624.12 |
| 3,595,273 | 7/1971 | Kobodziej | 137/624.12 |
| 3,803,923 | 4/1974 | Hajny | 137/624.12 X |

Primary Examiner—Alan Cohan
Attorney, Agent, or Firm—McGlew and Tuttle

[57] ABSTRACT

A mixing valve mechanism which is operable by a clockwork mechanism has a valve member which is movable in a valve chamber of the housing for opening and closing an outlet passage. The valve member has an upwardly extending follower portion which engages against a cam plate which is rotatably mounted in the housing above the follower. Spring means are provided for urging the follower of the valve member into engagement with the cam, and the cam has a control surface which during a portion of rotation of the cam moves the valve member downwardly into a closed position and which during another portion permits it to move upwardly under the action of the return spring. A handle member is mounted on the housing, and it is coupled by coupling means to the cam to rotate the cam to drive the clockwork during a portion of the rotational movement of the handle member and to lower valve member to close the passage during another portion of the movement. In addition, the clockwork mechanism can drive back through the cam to permit the valve member to move upwardly in a return direction to the outlet passage after the clock mechanism has timed the cam movement.

8 Claims, 7 Drawing Figures

CLOCKWORK CONTROL VALVE MECHANISM

BACKGROUND OF THE INVENTION

1. Field of the Invention

The invention relates in general to mixing valves and in particular to a new and useful mixing set with a timing clockwork.

2. Description of the Prior Art

Experience has been made that prior art mixing sets having a timing control are not only very expensive in construction but are also susceptible to troubles. The forces to be overcome by the clockwork spring while the clock is running down are considerable, and the maintenance required and particularly the exchange of individual parts are complicated and troublesome. That is why the invention is directed to a mixing set with a timing clockwork which is simple in attendance and maintenance and which is exposed to no direct mechanical load during the winding, run-down and return.

SUMMARY OF THE INVENTION

In accordance with the invention there is provided a valve control member which is movable upwardly to close an outlet passage of the valve and it has a follower engaged with a rotary cam in the housing which is coupled to a clockwork mechanism and which also may be rotated by a control handle. The control handle is effective to displace the cam so as to cause lowering of the valve member into a closed position during a portion of its rotation and thereafter to wind the clock mechanism. After the clock mechanism is wound it may drive backwardly through the cam to permit the valve member to move to a closed position under the return force of a return spring. During an initial rotation of a knob or sleeve member connected to the cam, the clockwork is wound. During a further portion of turning, the valve member is moved into a closed position. The clockwork mechanism drives the valve member to a position in which the valve member may be closed again under the influence of the return spring.

The sleeve member and the clockwork thus form a unit which is supported on the upper housing part and loosely coupled to the cam plate by which the rotary motion received from the clockwork is transmitted through the follower as an axial stroke motion to the valve member, to open or close the valve.

Advantageously, the actuating knob is designed as a cap and mounted by means of ball bearings on the upper housing part. It is particularly useful if the cap-shaped knob comprises a removable cover making it possible, if needed, to have an easy access to the clockwork accomodated in the knob; in this way, for example, the clockwork and the cam plate may be removed or exchanged in the most simple manner.

The coupling between the knob, clockwork, and control plate is of such design, in accordance with the invention, that upon turning the knob from its rest position (corresponding to the closed position of the valve), and due to a corresponding idle path of the coupling motion between the clockwork and the cam plate, first, only the clock is wound up, then also the cam plate is turned, whereby, through the follower, the valve is opened, and the clockwork is simultaneously set to its run-down time. Now, while the clock is running down (which, for example, may be a period of 1 to 5 minutes, depending on the cam plate), the valve remains open; then the clockwork disengages and drives the cam plate back into the initial position thereof, so that at the same time, through the follower, the valve is closed.

It has proved particularly advantageous in this connection to provide an angle of rotation of 45° (or 60°) for example, for the winding of the clock, and an angle of rotation of about 130° for the valve stroke and rundown range of the clockwork, so that a turning of the knob through about 190° is sufficient for actuating the set.

Accordingly, it is an object of the invention to provide in an apparatus for controlling the operation of a fluid mixer which has a valve member to open and close a valve passage in a housing a using a clockwork mechanism to time the opening and closing of the valve member, the improvement comprising a housing having a valve chamber with a valve outlet passage, an elongated valve member axially movable in the chamber and a follower associated with the valve member engageable with a cam plate which is rotatably mounted in the housing above the follower and is biassed by a return spring to engage the follower with the cam, the cam having a control surface which acts on the follower to move it axially during rotation of the cam through a portion of its rotational path, and to permit axial movement of the valve member by the return spring and which also includes a sleeve member which is rotatably mounted in the housing coupled to the clockwork mechanism which is effective to drive the cam during a portion of the rotation of the cam and to lower the valve member to close the valve during a further portion, wherein the clockwork performs a return movement of the cam to permit the valve member to close again.

A further object of the invention is to provide an apparatus for controlling the operation of a fluid mixer using a clockwork mechanism which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
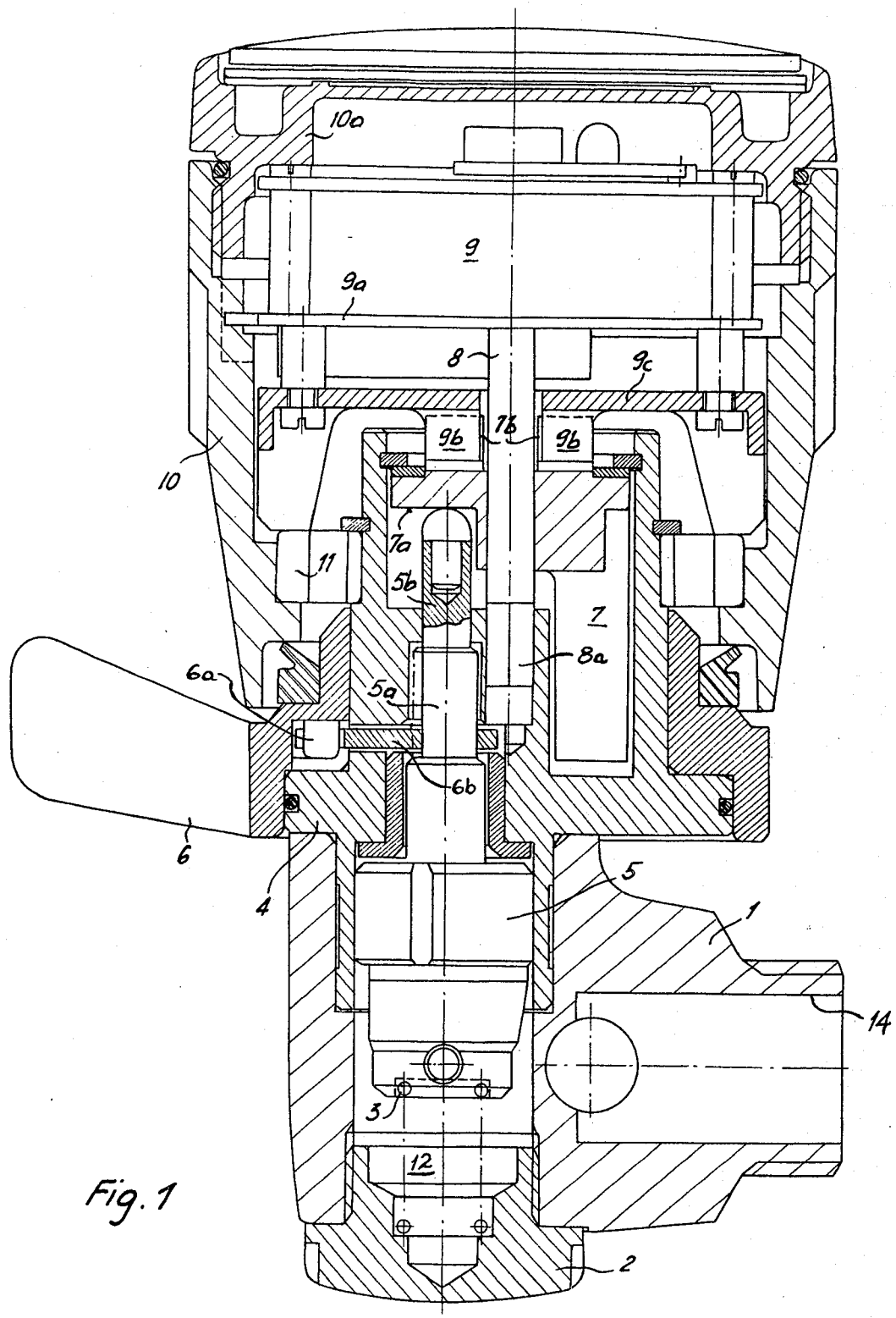
FIG. 1 is an axial sectional view of a valve mixer having a timing clockwork and constructed in accordance with the invention.

Referring to the drawings in particular, the invention embodied therein comprises an apparatus for controlling the operation of a fluid mixer having a fluid mixer housing generally designated 1 so as to open and close a valve passage 14 in the housing using a clockwork mechanism 9 of a known construction to time the movement of the valve member 5.

Figure 2:
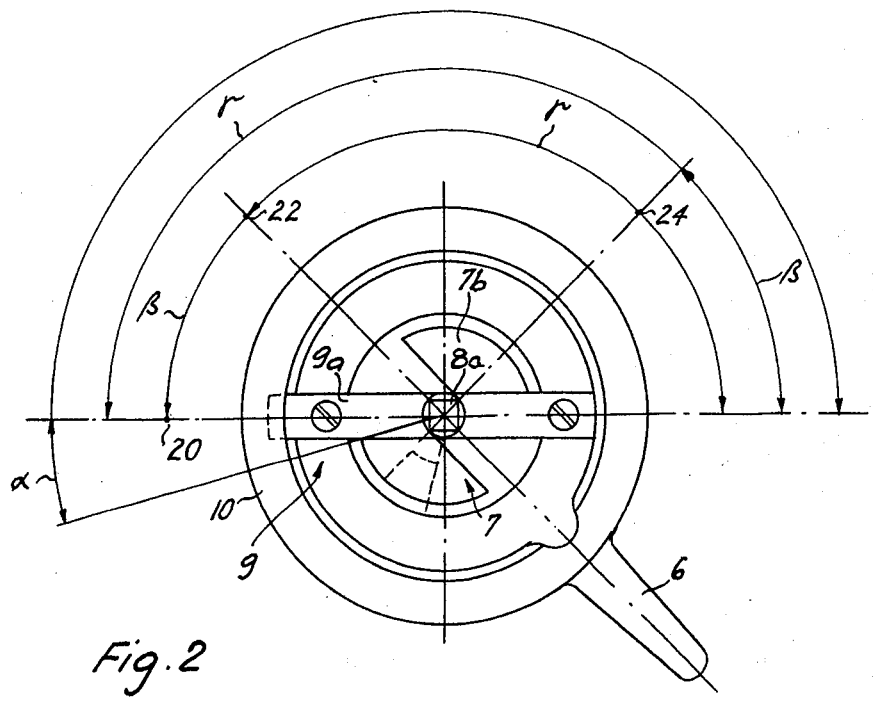
FIG. 2 is a diagrammatical top view of the control handle indicating the coupling thereof to the cam and the clockwork mechanism.
Figure 3:
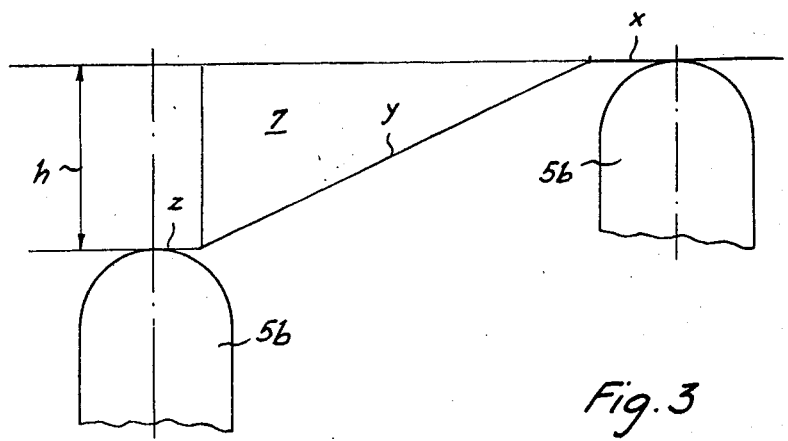
FIG. 3 is a developmental view of the cam indicating the movement of the valve member follower.
Figure 4:
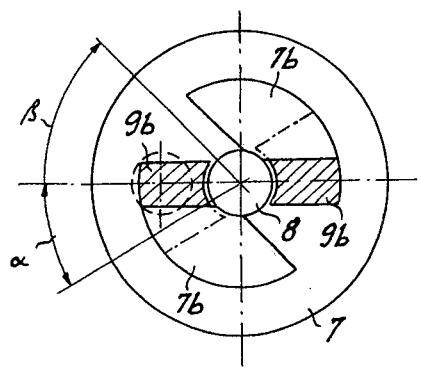
FIGS. 4–7 are schematic view indicating various angular positions between the clockwork mechanism and the cam plate.

The shown mixing set comprises the usual valve housing 1 with a cap 2 closing a valve or mixing chamber 12 downwardly and serving at the same time as an abutment for a return spring 3 which bears against the valve control member 5 which is braced upwardly into an upper part 4 of the valve housing into a position closing valve outlet passage 14. An eccentric shank portion 5a of a control member 5 is connected to a handle 6 which is mounted externally on upper part 4 and with which, in a known manner, the mixture ratio of hot and cool water and thus the temperature of the mixture can be adjusted. The upwardly extended shank of control member 5 is shaped as a follower pin 5b cooperating with a control surface 7a provided on the underside of a cam plate 7. Cam plate 7 is rotatably mounted on a bolt 8 which is received in upper part 4 in a position which is eccentric relative to the axis of control member 5. As shown in FIGS. 1 and 2, the bolt 8 has a shaft with a square portion 8a received in upper part 4. This bolt 8 also carries a clockwork 9 which is disposed above cam plate 7; a tensioning member 9a of clockwork 9 is connected to a sleeve-shaped rotary knob 10. The rotary knob is closed on its top by a removable cover 10a and surrounds both the clockwork 9 and the cam plate 7 and is mounted for rotation on upper part 4 and by means of a ball bearing 11 which is secured against axial displacement. Cam plate 7 is pivotable about the axis of bolt 8 and provided, on its top side, with two diametrically opposite, sector-shaped coupling cams 7b between which two driving legs 9b project from the underside of output member 9c of clockwork 9. Handle 6, as shown in FIG. 1, has a cam 6a engaged by a fork 6b fixed upon portion 5a of control member 5. Turning of handle 6 turns portion 5a and thus moves axially in a manner not shown, an inner control element of member 5 which uncovers the inlet ports (not shown) of hot and cold water so as to control the temperature of the water mixture leaving the valve upon opening of member 5 by the clock and control mechanism described. Temperature control of the water is not effected by the handle 6 since it does not cause the axial movement of member 5. The axial movement of member 5 for opening and closing the valve is controlled by cam plate 7 actuated by the clock-work 9 and rotary knob 10 as described.

The operation of the mixing set will now be described, by way of example, with reference to FIGS. 2 to 7.

Figure 5:
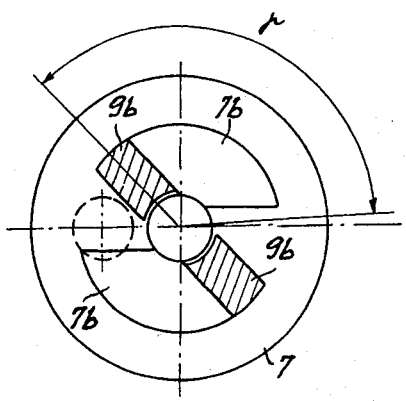
Figure 6:
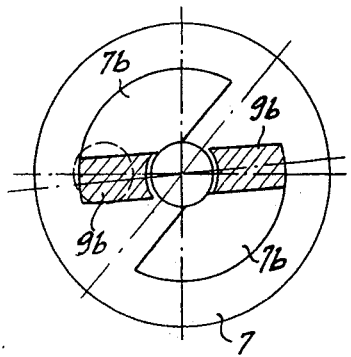
Figure 7:
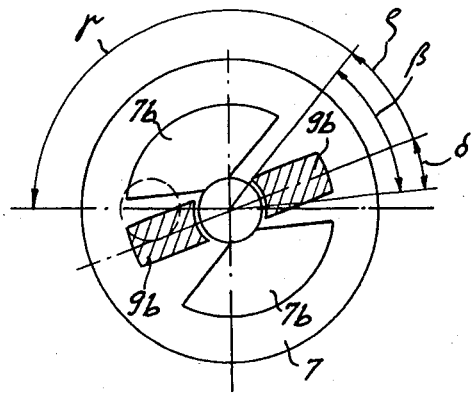

The clockwork 9 is mounted in such a manner that with the valve in closed position and rotary knob 10 in its corresponding end position (diagrammatically shown as mark 20, at the left-hand side of FIG. 2), the clockwork is biased through a small angle alpha ($\alpha$ FIG. 2). If now, starting from the end position of rotary knob 10 shown in FIG. 2, the knob is turned clockwise, initially, only clockwork 9, forming a unit therewith, is wound up, while the driving legs 9b of the clockwork freely move through an angel beta ($\beta$) (mark 20 to mark 22 in FIG. 2), from the one to the other of the two sectorial coupling cams 7b of cam plate 7 (FIG. 5).

In the course of further turning rotary knob 10 through an angle gamma ($\gamma$), driving legs 9b rotate cam plate 7. This causes follower pin 5b to slide from a dwell face x of control surface 7a on the underside of cam plate 7, which is perpendicular to the axis of follower pin 9, to and along a sloping face y, so that both follower 5b and control member 5 are pushed downwardly through a distance h into the open position of the valve, in which follower pin 5b comes to a stop on a second dwell face z of cam plate 7. Driving legs 9b and coupling cams 7b are now in their end positions shown in FIG. 6. It should be noted that in the entire period of time during which rotary knob 10 is rotated [angles beta ($\beta$) and gamma ($\gamma$)], the clockwork is being wound up, and that within a predetermined angular end zone delta of angle gamma, the clock spring becomes engaged with teeth of the clock gearing. The result is that upon termination of the rotary motion of knob 10 through angles beta and gamma up to mark 24 of FIG. 2 (by which the clock is wound up and its spring comes into engagement) the clockwork 9 performs a return motion, taking rotary knob 10 along through the run-down angle delta ($\delta$) (which is always smaller than the recess angle beta between coupling cam 7b). After having covered this angular distance delta, the gearing of the clock becomes disengaged again and the clock tension member relaxes abruptly. This causes driving legs 9b to impinge on coupling cams 7b, so that cam plate 7 is moved back into its initial position. The hard impact of cam plate 7 on its end stop may be absorbed by a damping member of nitrile rubber, for example. It will be understood that during this return motion of cam plate 7, follower pin 5b is struck down from its dwell face and displaced, along oblique surface y, back into its rest position on the second dwell face x, so that the valve is positively closed.

What is substantial in the described designed and operation of the set is the dimensioning of the angles of rotation beta and gamma. It has been found that, advantageously, the so-called stroke angle rho, i.e. the rest of recess angle beta remaining after the run-down of the clock (angle delta) up to the impact of driving legs 9b on the coupling cams 7b, is to be 30°, and the angle of rotation of the cam plate, i.e. angle gamma, 130°. In addition to this basic angle of 160°, the run-down angle is to be considered which depends on the construction of the employed clockwork. A clockwork having a run-down angle of 7.5° and a running time of 12.7 seconds, both per engaged tooth, has proved particularly suitable. With the use of such a clockwork and the provision of a basic angle of 160°, the values shown in the following table are obtained:

| TABLE OF TIMES AND ANGLES | | | |
| --- | --- | --- | --- |
| Running Time in Seconds | Clock Angle δ | No. of Teeth | Recess Angle | Total Angle of Rotation β + γ |
| 12.7 | 7.5° | 1 | 37.5° | 167.5° |
| 25.4 | 15° | 2 | 45° | 175° |
| 38.1 | 22.5° | 3 | 52.5° | 182.5° |
| 50.8 | 30° | 4 | 60° | 190° |
| 63.5 | 37.5° | 5 | 67.5° | 197.5° |
| 76.2 | 45° | 6 | 75° | 205° |
| 88.9 | 52.5° | 7 | 82.5° | 212.5° |
| 101.6 | 60° | 8 | 90° | 220° |
| 114.3 | 67.5° | 9 | 97.5° | 227.5° |
| 127 | 75° | 10 | 105° | 235° |
| 139.7 | 82.5° | 11 | 112.5° | 242.5° |
| 152.4 | 90° | 12 | 120° | 250° |

In accordance with these data, the rotary knob-clockwork 9, 10 should be designed for a total angle of rotation of at least 167.5° and of 250° at most.

It is possible, for example, to equip a set with a cam plate having a recess angle of only 37.5°; then, of course, the sole settable run-down time would be 12.7 seconds in each instance. However, if the set is equipped with a cam plate having a recess angle beta of 120°, a turning of rotary knob 10 up to an engagement of a corresponding number of teeth of the clockwork makes it possible to set correspondingly different water flow times, between 12.7 and 152.4 seconds.

The described manner of coupling between knob 10, the clockwork 9, and cam plate 7, makes it also possible, of course, to close the valve any time manually, by turning rotary knob 10 back, provided that the clockwork, as quite usual and advantageous, comprises a slipper clutch bridging the tooth engagement. Therefrom it results that the clockwork is never exposed to a direct mechanical load, neither during the winding up nor during the run-down or return. Also, due to the described construction, the frictional forces to be overcome by the clockwork (ball bearing 11, spray water seal 10b, between rotary knob 10 and handle 6, and follower 5b on cam plate 7) are small.

Another substantial advantage of the disclosed set is that parts to be maintained or exchanged are easily accessible. Upon removing cover 10a of rotary knob 10, the clockwork 9 is exposed and may be removed as a unit; this makes accessible also cam plate 7 which may then be removed or exchanged. By removing closing cap 2 with spring 3 from housing 1, the control member 5 along with follower 5b may also be removed as a unit.

While a specific embodiment of the invention has been shown and described in detail to illustrate the application of the principles of the invention, it will be understood that the invention may be embodied otherwise without departing from such principles.

What is claimed is:

1. In an apparatus for controlling the operation of a fluid mixer of the type having a valve member to open and close a valve passage in a valve housing and a clockwork mechanism for timing the opening and closing of the valve member, the housing having a valve chamber with a valve outlet passage, the improvement comprising an elongated valve member axially movable in the chamber, said elongated valve member having an axially extending follower portion, a cam plate rotatably mounted in said housing adjacent one end of said follower portion and engaged with said follower portion for the controlled movement of said valve member, spring means for biasing said valve member towards said cam plate to engage said follower portion with said cam plate, said cam plate having a control surface acting on said follower portion to move said valve member axially during a portion of rotation of said cam plate, a sleeve member rotatably mounted on said housing operatively connected to the clockwork mechanism, said sleeve member being rotatably operative to wind the clockwork mechanism during a first portion of the rotational movement of said sleeve member, interengaging means for engaging said clockwork mechanism and said cam plate which are disengaged during said first portion of the rotational movement and which are engaged during a further rotational movement of said sleeve member to drive said cam plate during said further rotational movement while winding of said clockwork mechanism continues during said further rotational movement, and said interengaging means being operative to drive said cam member oppositely upon release of said sleeve member.

2. The improvement according to claim 1, wherein said housing comprises a cylinder member having an open top, a cover closing said top, said clockwork mechanism being removable through the opening closed by said cover, the cam plate being similarly removable, the bottom of said housing being open and a closing cap closing the bottom of said housing, said valve control being removable through the opening closeable by said cap.

3. The improvement according to claim 1, further comprising a removable cover overlying said housing and enclosing said clockwork, an upright bolt non-rotatably fixed in said housing around which cam plate is rotatable, the clockwork mechanism being mounted to said bolt, and said bolt being axially offset from said follower portion.

4. The improvement according to claim 3, wherein said interengaging means is operatively connected to said clockwork and includes driving members engageable with said cam plate, said cam plate having arcuately spaced apart cam stop surfaces, said driving members having a run-down arcuate path of movement which is smaller than the angle between said cam stop surfaces.

5. The improvement according to claim 4, wherein said sleeve member is rotatable to a run-down position at which said clockwork mechanism will drive in an opposite direction and in which the drive members of the clockwork mechanism are biased by a small angle.

6. The improvement according to claim 5, wherein said cam plate is moved by said sleeve member through angle of rotation gamma within which a control surface of the cam plate brings said follower portion and said valve member into an open position and in which said clock mechanism run down time is set.

7. The improvement according to claim 6, wherein said sleeve member is rotatable through an angle beta of at least 37.5° and 120° at most, the maximum sum of the angles of rotation beta and gamma of said rotatable sleeve member being at least 167.5° and 250° at most and with the angle of rotation gamma of said cam plate being 130°.

8. The improvement according to claim 7, wherein the clock mechanism has a run-down time of 12.7 seconds which corresponds to a run-down angle delta of 7.5°.

* * * * *